Figure 1:
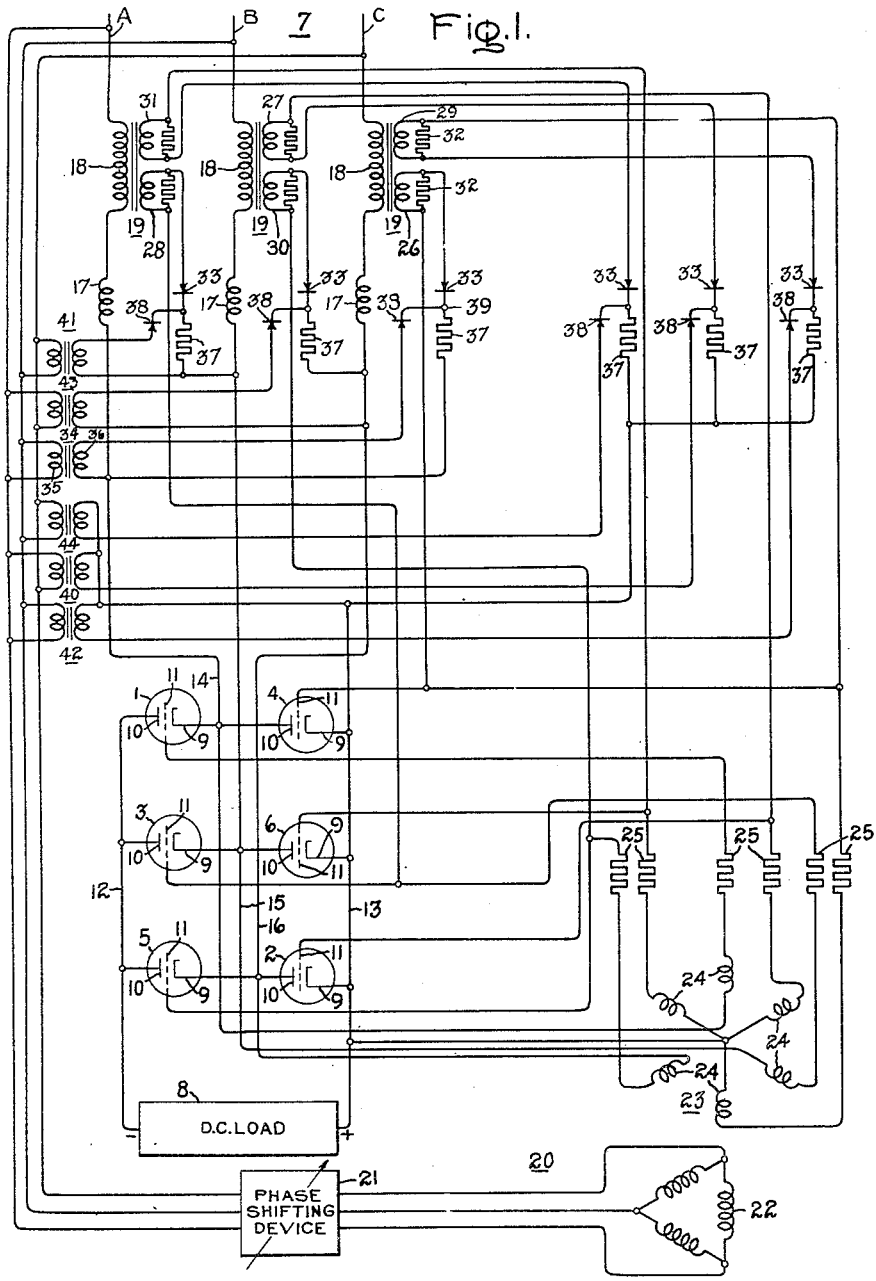

Inventors:
Ernst F. W. Alexanderson,
Albert H. Mittag,
Earl L. Phillipi,
by Paul A. Frank
Their Attorney.

Patented Apr. 10, 1951

2,548,577

UNITED STATES PATENT OFFICE 2,548,577

FAULT-SUPPRESSING CIRCUITS

Ernst F. W. Alexanderson, Albert H. Mittag, and Earl L. Phillipi, Schenectady, N. Y., assignors to General Electric Company, a corporation of New York Application December 30, 1949, Serial No. 135,984

2 Claims. (Cl. 321—13)

Our invention relates to rectifiers and inverters of the grid-controlled type, and more particularly to the suppression of faults therein.

In many applications making use of grid-controlled rectifiers and inverters, such as frequency-changers and the like, it is highly desirable to reduce to a minimum the effects of short-circuits or faults and the time before normal operation is reestablished after occurrence thereof. While protective relay systems are generally employed in such applications, it is frequently desirable to provide fault-suppressing action in advance of operation of the protective relays to prevent otherwise simple faults from resulting in complete short-circuits. Such fault-suppressing action may be effectively obtained in grid-controlled rectifiers by limiting fault currents to values within the commutating ability of the electron discharge devices thereof.

Accordingly, it is a principal object of our invention to provide new and improved fault-suppressing circuits in grid-controlled rectifiers and inverters, whereby current-limiting action is effected to prevent fault currents from exceeding the commutating ability of the electron discharge devices employed therein.

Broadly speaking, our invention provides for controlling the potentials of the control electrodes or grids of the various electron discharge devices or tubes in a rectifier in such a manner that current flowing through a particular tube during a period of conduction is made to delay firing of a subsequent tube in the firing sequence if the current exceeds the normal value, thereby limiting the current conducted by the latter tube.

In accordance with one embodiment of our invention, a voltage proportional to the current in a tube is introduced in the grid circuit of a subsequent tube in the firing sequence. This voltage is opposed by a variable bias voltage derived from the input voltage to the rectifier. At normal load currents the difference between these voltages is positive and the grid reacts in a normal way to fire the tube as intended by the grid firing circuit. If, however, the current exceeds the normal value, the difference between these voltages becomes negative and the grid is held temporarily somewhat negative to delay firing action.

In a modification of the above arrangement a fixed bias voltage is employed. In another modification a capacitance is employed in conjunction with a variable biasing voltage to provide a transient fault-suppressing circuit having a diminishing current-limiting action.

Our invention will be better understood by reference to the following description taken in connection with the figures of the accompanying drawings, and to the appended claims in which the features of our invention believed to be novel are more particularly set forth.

Figure 2:
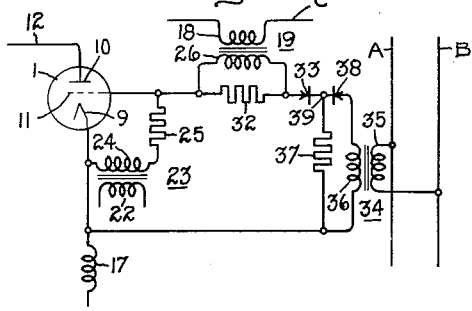
Figure 3:
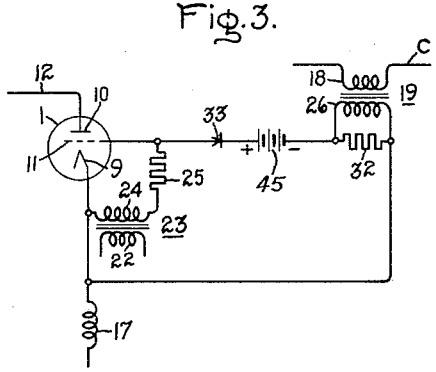
Figure 4:
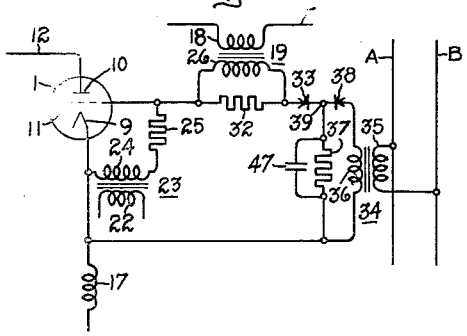

In the drawings, Fig. 1 is a schematic diagram of a rectifier of the grid-controlled type embodying fault-suppressing circuits constructed in accordance with our invention; Fig. 2 is a simplified schematic diagram of a portion of the arrangement of Fig. 1, showing particularly a typical fault-suppressing circuit; Figs. 3 and 4 are simplified diagrams of modifications of the arrangement of Fig. 1, Fig. 4 representing a transient fault-suppressing circuit.

Referring now to Fig. 1, there is shown a rectifier employing a plurality of electron discharge devices 1—6, and generally arranged to be supplied with power from a three-phase alternating-current source 7 and to supply power to a direct-current load circuit 8. The phases of source 7 are designated A, B and C, respectively, and source 7 is assumed to have phase rotation A—B—C.

Electron discharge devices 1—6 are generally similar and accordingly each has a cathode 9, an anode 10, and a control electrode 11. Devices 1—6 are arranged in a conventional full-wave bridge. Anodes 10 of devices 1, 3 and 5 are commonly connected to form negative connection 12 to load circuit 8, while cathodes 9 of devices 2, 4 and 6 are commonly connected to form positive connection 13 to load circuit 8.

Cathode 9 and anode 10 of devices 1 and 4, respectively, are commonly connected to form one input connection 14 to the full-wave combination of devices 1—6. Cathode 9 and anode 10 of devices 3 and 6, and of devices 5 and 2 are similarly commonly connected to form the other two input connections 15 and 16, respectively, to the full-wave rectifier combination. Connections 14, 15 and 16 are connected to lines A, B and C, respectively, of source 7 through a plurality current-limiting reactances 17 and the primary windings 18 of a plurality of current transformers 19.

Control electrodes or grids 11 of devices 1—6 are connected to a firing circuit 20 which in turn is connected to lines A, B and C of source 7. Firing circuit 20 comprises a phase-shifting device 21, such as a rotary phase-shifter, the output terminals of which are connected to the primary winding 22 of a three-phase grid transformer 23. Transformer 23 is provided with a plurality of secondary windings 24 of suitable phase relationship for firing devices 1—6. Windings 24 are connected through a plurality of current-limiting resistances 25 to the respective grids 11 of devices 1—6. It will be understood that with the assumed phase rotation of source 7 and the connections to windings 24 as shown in Fig. 1, the firing sequence of devices 1—6 is the same as the numerical sequence thereof.

The system as thus far described is a grid-controlled rectifier of conventional type. Attention is next directed to a plurality of fault-suppressing circuits associated with grids 11 of electron discharge devices 1—6. A plurality of secondary windings 26—31 of transformers 19, each winding having a resistance 32 connected thereacross, are employed to provide signals in the grid circuits of devices 1—6 proportional to the currents supplied thereto.

One pair of windings 26—31 is associated with each of the transformers 19 in lines A, B and C, each pair of windings thus having currents therein responsive to current in one line. Windings 28 and 31 associated with line A are connected in the grid circuits of devices 3 and 6, respectively. Windings 27 and 30 associated with line B are similarly connected in the grid circuits of devices 2 and 5, respectively, while windings 26 and 29 associated with line C are connected in the grid circuits of devices 1 and 4, respectively.

Since the fault-suppressing circuits individually associated with devices 1—6 are substantially identical only a single circuit, namely that associated with device 1, will be described. In the firing sequence current is commutated from device 5 to device 1 and accordingly it is desirable to control the firing of device 1 in accordance with the current conducted by device 5. The latter is supplied with current through line C and therefore winding 26 which is associated therewith is employed in the fault-suppressing circuit for device 1. One terminal of winding 26 is connected directly to control electrode 11 of device 1. The other terminal of winding 26 is connected to one terminal of a unidirectional conducting device 33 such as a selenium rectifier. A source of biasing voltage is obtained through the use of a transformer 34, the primary winding 35 of which is connected between lines A and B. One terminal of the secondary winding 36 of transformer 34 is connected directly to line A, to which is also connected cathode 9 of device 1. The terminal of winding 36 connected to line A is also connected to a resistance 37. The other terminal of winding 36 is connected to one terminal of a second unidirectional conducting device 38. Unidirectional conducting devices 33 and 38 are commonly connected at a junction point 39 and are oppositely poled with respect thereto so that current may flow through devices 33 and 38 towards junction 39.

The fault-suppressing circuits associated with devices 2—6 derive current signals from secondary windings 27—31, respectively, so that in each case the firing of a particular device is controlled in accordance with the current conducted by a preceding device in the firing sequence. Biasing voltages are provided for the fault-suppressing circuits of devices 2—6 by a plurality of transformers 40—44 which are similar to transformer 34 previously mentioned in connection with the fault-suppressing circuit of device 1. The primary windings 35 of transformers 40—44 are connected to phases A, B and C to provide biasing voltages having suitable phase relationship with the currents supplied to devices 2—5 for the various fault-suppressing circuits. Each of the fault-suppressing circuits associated with devices 2—6 includes a pair of unidirectional conductors 33 and 38 and a resistance 37 as in the case of the fault-suppressing circuit associated with device 1.

To assist in the understanding of the operation of the fault-suppressing circuits described, it will be helpful to refer to Fig. 2 in which device 1 and the fault-suppressing circuit associated therewith are shown separated from the remainder of the rectifier circuit. As is well-known, when the potential of anode 10 of device 1 is positive with respect to the potential of the cathode 9 and control electrode 11 is likewise positive with respect thereto, current is conducted by device 1 from anode 10 to cathode 9.

As was mentioned previously, it is desirable to control the firing of device 1 in accordance with the current conducted by device 5 which flows in line C. The magnitude of this current is sensed by secondary winding 26 of the transformer 19 connected in line C and is impressed on resistance 32. The voltage impressed on resistance 32, which may be conveniently termed the load voltage, is at all times substantially proportional to the current in line C. The biasing voltage provided by secondary winding 36 of transformer 34 is impressed on resistance 37 through unidirectional conducting device 38 so that a voltage of fixed polarity but having a magnitude varying in accordance with the voltage between lines A and B appears across resistance 37. The voltages across resistances 32 and 37 are connected in series through unidirectional conducting device 33 and this series combination is connected between cathode 9 and control electrode 11.

At normal load currents in device 5 or in line C the bias voltage exceeds the load voltage and the difference therebetween is positive. Due to the presence of unidirectional conducting device 33 the grid reacts in a normal way and device 1 is fired as intended by the firing circuit. If, however, the current in device 5 and line C exceeds the normal value the load voltage exceeds the bias voltage and the difference therebetween becomes negative. Under this condition, the grid is held down to a voltage which is somewhat negative with respect to cathode 9 so that device 1 is temporarily prevented from firing.

Referring again to Fig. 1, the fault-suppressing circuits associated with devices 2—6 behave in substantially the same manner as the circuit of device 1. In each case the firing of a particular device is controlled by the current flowing in the preceding device from which current is commutated in the firing sequence. More particularly, firing of device 3 is controlled by current in device 1 and firing of device 5 is controlled by current in device 3. Similarly, firing of device 2 is controlled by current in device 6, firing of device 4 by current in device 2, and firing of device 6 by current in device 4.

If it is assumed that a rectifier with a protective system of the type shown and described above is operated at full load and is suddenly subjected to short-circuit conditions, a short-circuit current flows which is limited to a value determined by the grid circuit. Due to action of the fault-suppressing circuits the grids are prevented from firing at the moment determined on by the normal grid control and firing action is delayed so that the resultant rectifier voltage is just sufficient to force a limited current through the circuit. It has been found, therefore, that a rectifier thus protected acts as a normal constant-potential rectifier at values of current below the value at which the current limit becomes effective, and at values thereabove becomes substantially a constant-current rectifier.

Referring now to Fig. 3, there is shown a modification of the arrangement of Figs. 1 and 2 wherein the variable source of bias voltage, as provided by transformer 35, unidirectional conductor 38, and resistance 37, is replaced by a fixed unidirectional source of bias voltage such as a battery 45. The modified fault-suppressing circuit associated with device 1, as shown in Fig. 3, comprises a unidirectional conductor 33, battery 45, and the parallel combination of winding 26 and resistance 32. As in the circuit previously described, this series combination is connected between grid 11 and cathode 9. Conducting device 33 is poled to permit conduction of current in the direction from grid 11 to cathode 9, while battery 45 is poled to tend to circulate current in the opposite direction.

At normal current in line C the voltage proportional thereto appearing across resistance 32 is exceeded by bias voltage 45, the difference between the two voltages being positive. Under this condition the grid reacts in a normal way and device 1 is fired as intended by the firing circuit. If however, the current in line C exceeds the normal value, the load voltage exceeds the bias voltage and the difference therebetween becomes negative. Under this condition grid 11 is maintained somewhat negative with respect to cathode 9 so that device 1 is temporarily prevented from firing as in the case of the circuit shown in Fig. 2. It will thus be seen that the operation of the circuit of Fig. 3 is substantially the same as the operation of the circuit of Fig. 2. It has been found, however, that by the use of a fixed source of bias voltage, the rectifier voltage does not drop off as rapidly when approaching the limiting current as in the case of a variable source of biasing voltage.

The fault-suppressing circuits shown in Figs. 2 and 3 may be termed "permanent" fault-suppressing circuits since the current-limiting feature thereof tends to persist for the duration of a short-circuit condition. Referring now to Fig. 4, there is shown a fault-suppressing circuit which may be termed a "transient" fault-suppressing circuit since current-limiting action thereof tends to diminish with time. The circuit of Fig. 4 is generally similar to the circuit of Fig. 2 except for the addition of a capacitance 47 connected across the resistance 37 in the bias voltage circuit.

During normal operation capacitance 47 is charged to a normal operating potential. If capacitance 47 is made relatively large it has a tendency to retain this potential for a short interval under fault conditions and to act as a source of constant potential in the fault-suppressing circuit. Thus if a short-circuit occurs on the rectifier a current-limiting action is provided which initially is similar to the action described in the arrangement of Fig. 2. The initial current-limiting value is automatically established by the charge which accumulates on the capacitance during normal operation. Therefore a relatively slight increase in current makes the current-limiting action effective. If a short-circuit on the rectifier is maintained, however, the capacitance is gradually charged, causing the current-limiting action to diminish with time so that the short-circuit current eventually reaches normal full value.

In certain cases, as for example when protective relays are employed in connection with rectifier apparatus, a transient fault-suppressing circuit is particularly useful. If a number of electron discharge devices are connected in series relation a short-circuit in only a portion of these devices may constitute a normal fault, while the remaining devices generally continue to function normally provided they are not overloaded. By making use of transient fault-suppressing circuits to provide current-limiting action in advance of operation of the protective relays, the short-circuit current in a normal fault may be prevented from rising beyond the limits which the devices can commutate and the devices which are not originally involved in the fault are enabled to continue to commutate and maintain the counter voltage. Thus the result of a simple fault is not a complete short-circuit but what may be characterized as a "partial" short-circuit since only a fraction of the counter voltage disappears. Under such conditions the duration of a fault and the subsequent recovery time may be made extremely short. A particular advantage of a transient fault-suppressing circuit is that the capacitance therein automatically adjusts the circuit to the load conditions and characteristics of the individual electron discharge device associated therewith.

In addition to advantages previously mentioned, fault-suppressing circuits constructed in accordance with our invention provide effects equivalent to the introduction of reactances at various points in a rectifier circuit. While such reactances, which are frequently employed for current-limiting and other purposes, are generally sizeable and costly, similar effects may be obtained at relatively little cost by suitable design of the grid circuits in grid-controlled rectifiers.

While we have shown and described certain preferred embodiments of our invention, it will be understood that our invention may well take other forms and we aim, therefore, in the appended claims, to cover all such changes and modifications which fall within the true spirit and scope of our invention.

What we claim as new and desire to secure by Letters Patent of the United States is:

1. In a rectifier of the grid-controlled type connected to an alternating current source and to a load device to be supplied with unidirectional current, the combination of a plurality of electron discharge devices each including a cathode, an anode and a control electrode, a firing circuit to cause firing of said devices and conduction of current thereby in a predetermined sequence, a current transformer arranged to sense the currents in said devices and including a plurality of secondary windings each having a current therein proportional to the current in one of said devices, and a plurality of fault-suppressing circuits each including in series relation the parallel combination of one of said secondary windings and a resistance connected thereacross, a unidirectional conductor, and a source of unidirectional bias voltage, each of said fault-suppressing circuits being connected between the cathode and control electrode of one of said devices and being arranged to delay firing of said device in response to excessive current in a preceding device in said firing sequence to limit the current in said first-mentioned device to a value within the commutating ability thereof.

2. In a rectifier of the grid-controlled type connected to an alternating current source and to a load device to be supplied with unidirectional current, the combination of a plurality of electron discharge devices, a firing circuit to cause firing of said devices and conduction of current thereby in a predetermined sequence, and a plurality of transient fault-suppressing circuits each including means responsive to the current in said devices and a capacitance chargeable in response to said current, each of said fault-suppressing circuits being arranged to delay firing of one of said devices in response to excessive current in a preceding device in said firing sequence to limit the current in said first-mentioned device to a value within the commutating ability thereof, the effectiveness of said fault-suppressing circuit to limit said current being progressively diminished by charging of said capacitance in response to said excessive current.

ERNST F. W. ALEXANDERSON.
ALBERT H. MITTAG.
EARL L. PHILLIPI.

REFERENCES CITED

The following references are of record in the file of this patent:

UNITED STATES PATENTS

| Number | Name | Date |
|---|---|---|
| 2,220,077 | Coffin | Nov. 5, 1940 |
| 2,300,872 | Cox | Nov. 3, 1942 |
| 2,338,037 | Hoffman et al. | Dec. 28, 1943 |